(12) United States Patent
Su et al.

(10) Patent No.: US 12,215,728 B2
(45) Date of Patent: Feb. 4, 2025

(54) SCREW

(71) Applicant: TAIWAN SHAN YIN INTERNATIONAL CO., LTD., Kaohsiung (TW)

(72) Inventors: Kou-Tsair Su, Kaohsiung (TW); Chen-Long Su, Kaohsiung (TW)

(73) Assignee: TAIWAN SHAN YIN INTERNATIONAL CO., LTD., Kaohsiung (TW)

( * ) Notice: Subject to any disclaimer, the term of this patent is extended or adjusted under 35 U.S.C. 154(b) by 97 days.

(21) Appl. No.: 18/343,951

(22) Filed: Jun. 29, 2023

(65) Prior Publication Data
US 2025/0003441 A1   Jan. 2, 2025

(51) Int. Cl.
| F16B 39/06 | (2006.01) |
| F16B 25/00 | (2006.01) |
| F16B 25/10 | (2006.01) |
| F16B 35/06 | (2006.01) |

(52) U.S. Cl.
CPC ........ F16B 35/065 (2013.01); F16B 25/0063 (2013.01); F16B 25/106 (2013.01)

(58) Field of Classification Search
CPC ... F16B 35/065; F16B 25/0063; F16B 25/106
USPC ........................................................ 411/399
See application file for complete search history.

(56) References Cited

U.S. PATENT DOCUMENTS

| 5,772,376 A * | 6/1998 | Konig ................... F16B 35/065 |
| | | 411/188 |
| 7,988,397 B2 * | 8/2011 | Bodin ................... F16B 35/048 |
| | | 411/399 |
| 2005/0226701 A1 * | 10/2005 | Craven ................ F16B 35/048 |
| | | 411/399 |
| 2007/0071576 A1 * | 3/2007 | Romano ................. F16B 33/02 |
| | | 411/399 |
| 2010/0158634 A1 * | 6/2010 | Walther ............. F16B 25/0015 |
| | | 411/399 |

(Continued)

FOREIGN PATENT DOCUMENTS

| CN | 104006050 A | 8/2014 |
| DE | 3143120 A1 | 5/1983 |
| TW | M531522 U | 11/2016 |

*Primary Examiner* — Gary W Estremsky
(74) *Attorney, Agent, or Firm* — Rosenberg, Klein & Lee

(57) ABSTRACT

A screw includes a shank extending axially from a head and thread convolutions spirally disposed on the shank. The head has a top surface, a conical surface opposite to the top surface, cutting units extending circumferentially of the top surface, accommodation portions recessedly provided in the conical surface, and ridge portions each located between every two adjacent accommodation portions. The accommodation portions and the ridge portions extend between the cutting units and the shank. Accordingly, the cutting units sever fibers and scrape burrs which incur a ragged edge of a workpiece, thereby preventing the entanglement of unsevered fibers. The ridge portions cut fibers into chips and guide chips to the accommodation portions for suitable accommodation of chips inside the accommodation portions, which attains a tight engagement between the screw and the workpiece, reduces screwing resistance, and allows the top surface to fit level with a surface of the workpiece.

6 Claims, 6 Drawing Sheets

(56) References Cited

U.S. PATENT DOCUMENTS

| | | | |
|---|---|---|---|
| 2012/0294693 A1* | 11/2012 | Gonciarz | F16B 25/0063 |
| | | | 411/387.1 |
| 2015/0063947 A1* | 3/2015 | Huang | F16B 35/065 |
| | | | 411/393 |
| 2016/0265578 A1* | 9/2016 | Lin | F16B 35/065 |
| 2018/0245620 A1* | 8/2018 | Huang | F16B 25/0057 |
| 2020/0056647 A1* | 2/2020 | Su | F16B 35/065 |

* cited by examiner

SCREW

BACKGROUND OF THE INVENTION

1. Field of the Invention

This invention relates to a screw and relates particularly to a screw capable of scraping burrs which incur a ragged edge of a workpiece, severing fibers, and increasing spaces for accommodating chips.

2. Description of the Related Art

Referring to FIGS. 1 and 2, a conventional screw 1 comprises a head 11, a shank 12 extending axially from the head 11, a drill section 13 disposed on the shank 12 opposite to the head 11, and a plurality of thread convolutions 14 spirally disposed on the shank 12. The head 11 has a top surface 111 and a conical surface 112 opposite to the top surface 111. The conical surface 112 of the head 11 is connected to the shank 12. During a screwing operation of the screw 1, the thread convolutions 14 cut into a workpiece 2, and synchronously create a drilling hole 21 on a surface 22 of the workpiece 2. While the thread convolutions 14 keep cutting downwards and leading the shank 12 into the workpiece 2 gradually, the conical surface 112 of the head 11 pushes and presses the drilling hole 21 until the top surface 111 is flush with the surface 22 of the workpiece 2 whereby the screwing operation is completed.

However, during the cutting operation of the thread convolutions 14, burrs easily protrude outwards from the drilling hole 21 to result in a ragged edge of the workpiece 2. Because the conical surface 112 of the head 11 is formed to be flat and smooth, the conical surface 112 cannot scrape the burrs and smooth the ragged edge of the workpiece 2 effectively. The conical surface 112 also cannot sever but only press fibers of the workpiece 2. Therefore, the ragged edge formed around the drilling hole 21 cannot be removed. Meanwhile, the head 11 is entangled easily in the unsevered fibers. During the screwing operation of the screw 1, the head 11 is also hindered from moving downwards caused by the elastic recovery force of the unsevered fibers, and that will increase the screwing resistance. The screw 1 cannot engage with the workpiece 2 tightly. If the screw 1 keeps pressing the unsevered fibers, it may cause that the workpiece 2 cracks, and that requires to be improved.

SUMMARY OF THE INVENTION

The object of this invention is to provide a screw capable of breaking fibers, smoothing burrs which cause a ragged edge, and widening spaces for chips accommodation thereby reducing screwing resistance and fitting the screw with a surface of a workpiece levelly.

The screw of this invention comprises a shank, a head and a drill section disposed on two opposite ends of the shank, and a plurality of thread convolutions spirally formed on the shank. The head has a top surface, a conical surface opposite to the top surface and connected to the shank, a plurality of cutting units disposed along an outer edge of the top surface, a plurality of accommodation portions recessedly formed in the conical surface, and a plurality of ridge portions. Every two adjacent ridge portions are separated by one accommodation portion so that the accommodation portions and the ridge portions are arranged by turns and positioned between the cutting units and the shank. Each cutting unit has a first wall defining a first edge, a second wall defining a second edge connected to the first edge, and a third edge formed along a junction of the first wall and the second wall. The second edge connects between one first wall of one cutting unit and another adjacent first wall of another cutting unit to thereby connect the cutting units one after another. Each accommodation portion has a main groove and an auxiliary groove encircling an outer periphery of the main groove so that the auxiliary groove and the main groove are different. The main groove extends in the direction of the shank. Each ridge portion extends along a junction of every two adjacent auxiliary grooves and situated between every two adjacent main grooves. During a screwing operation, the cutting units assist in cutting fibers around a drilling hole of a workpiece to thereby prevent the head from being tangled with twisting fibers and even burrs which cause a ragged edge of the drilling hole of the workpiece. The ridge portions also help cut the fibers into chips and push the chips into the accommodation portions which provide enough spaces for accommodating the chips to thereby attain a tight engagement between the screw and the workpiece, prevent the chips from accumulating around the head unduly, reduce the screwing resistance, and allow the top surface to be flat with a surface of the workpiece.

Preferably, an area of each auxiliary groove is smaller than an area of each main groove.

Preferably, the number of the cutting units is at least two times larger than the number of the accommodation portions.

Preferably, the main grooves are connected to part of the cutting units. The auxiliary grooves are connected to the remainder of the cutting units.

Preferably, the ridge portions extend respectively along a plurality of references lines defined radially from a center of the conical surface.

Preferably, a plurality of references lines are defined radially from a center of the conical surface. Each ridge portion extends between each cutting unit and the shank in a direction which is inclined to each corresponding one of the reference lines.

DETAILED DESCRIPTION OF THE PREFERRED EMBODIMENTS

Figure 1:
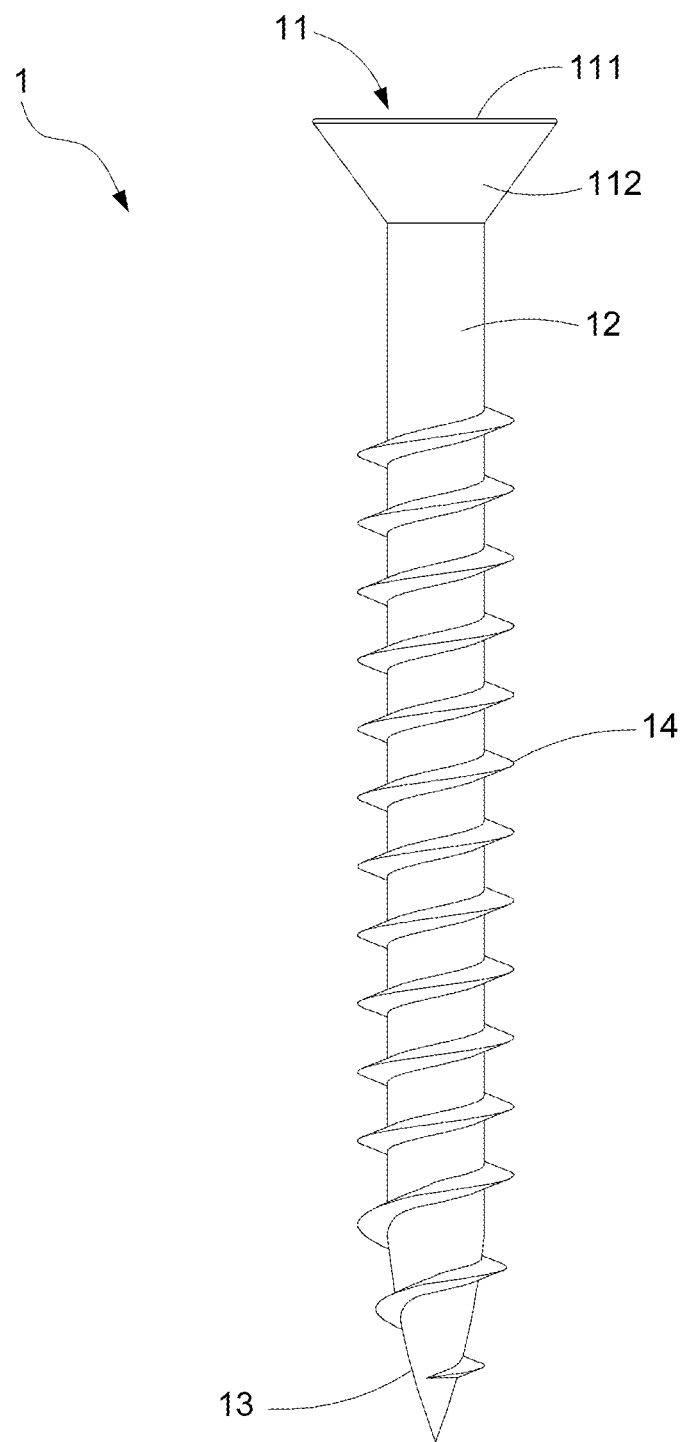
FIG. 1 is a schematic view showing a conventional screw.
Figure 2:
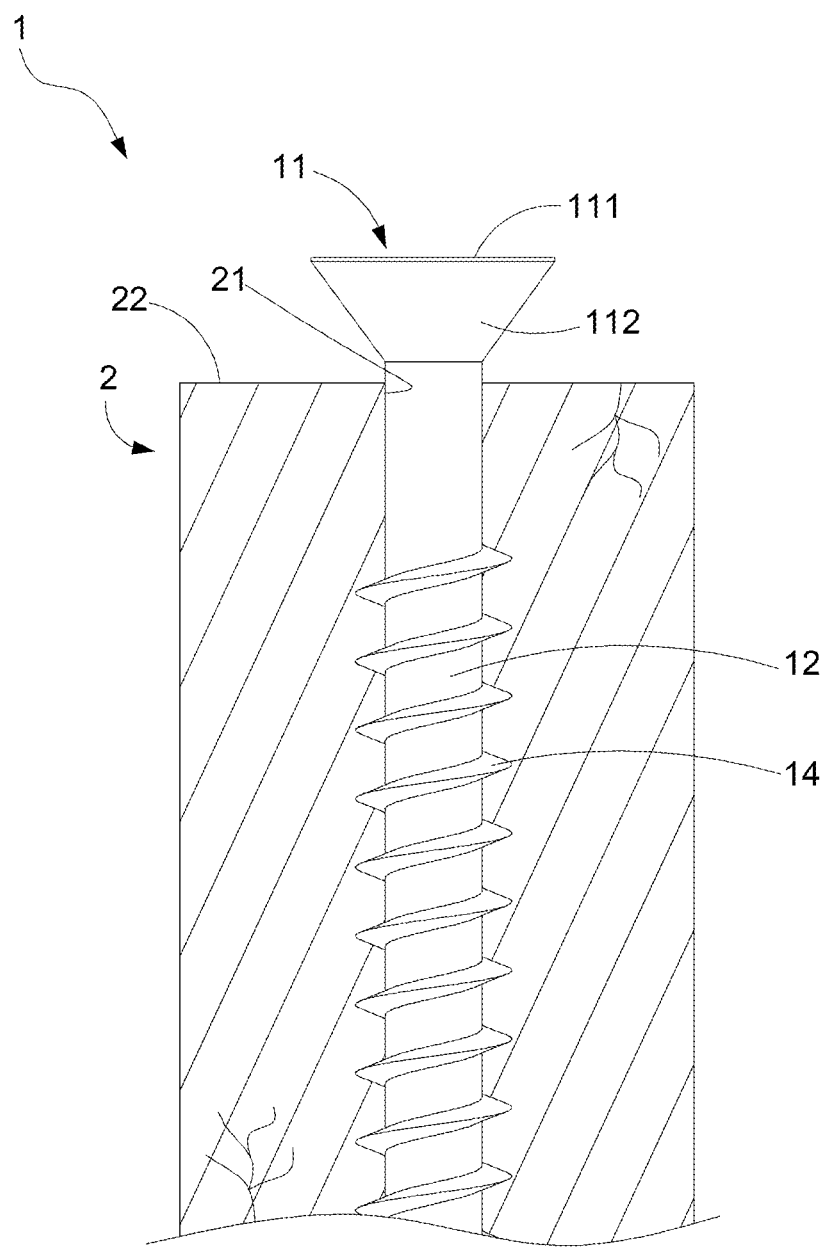
FIG. 2 is a schematic view showing a screwing operation of the conventional screw.
Figure 3:
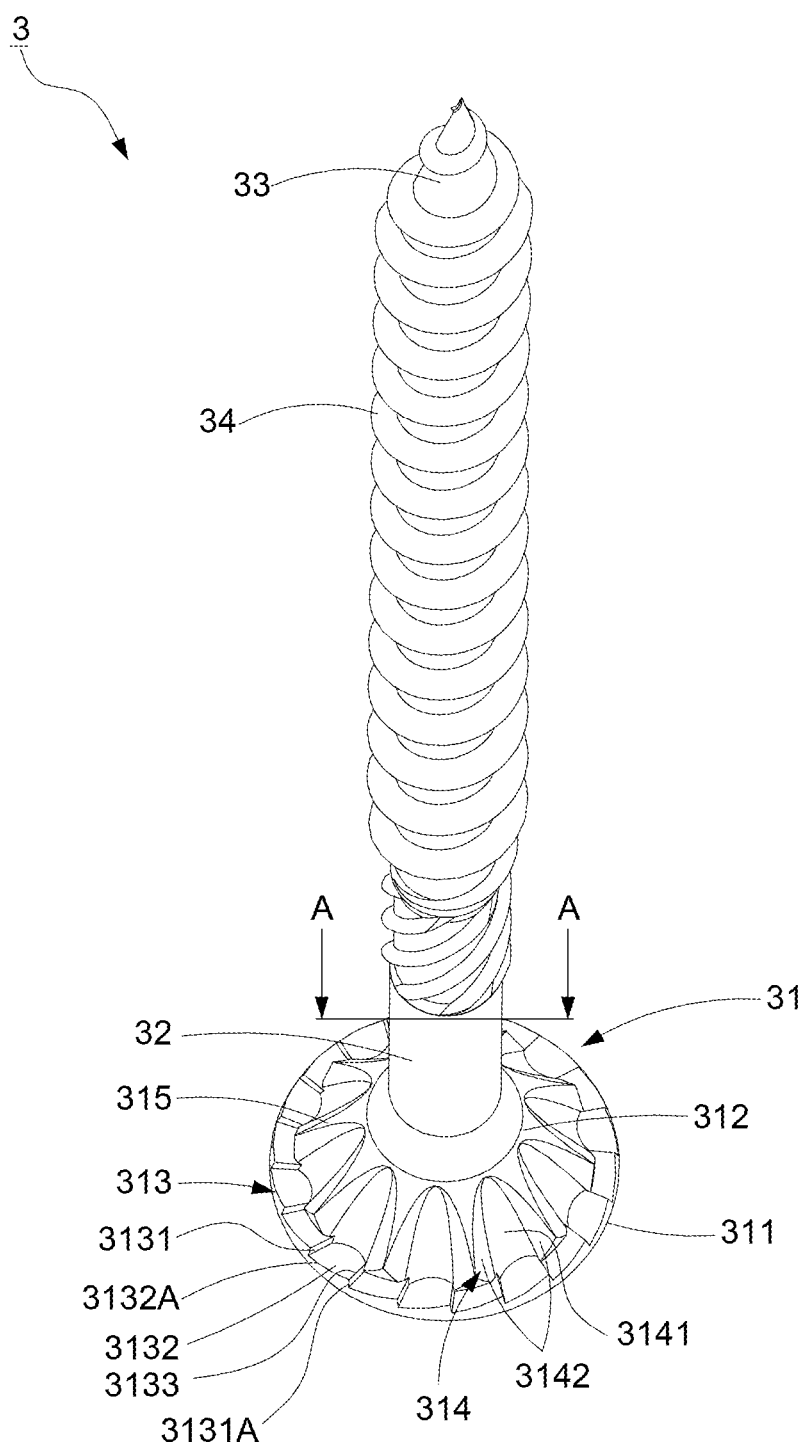
FIG. 3 is a perspective view showing a first preferred embodiment of this invention.
Figure 4:
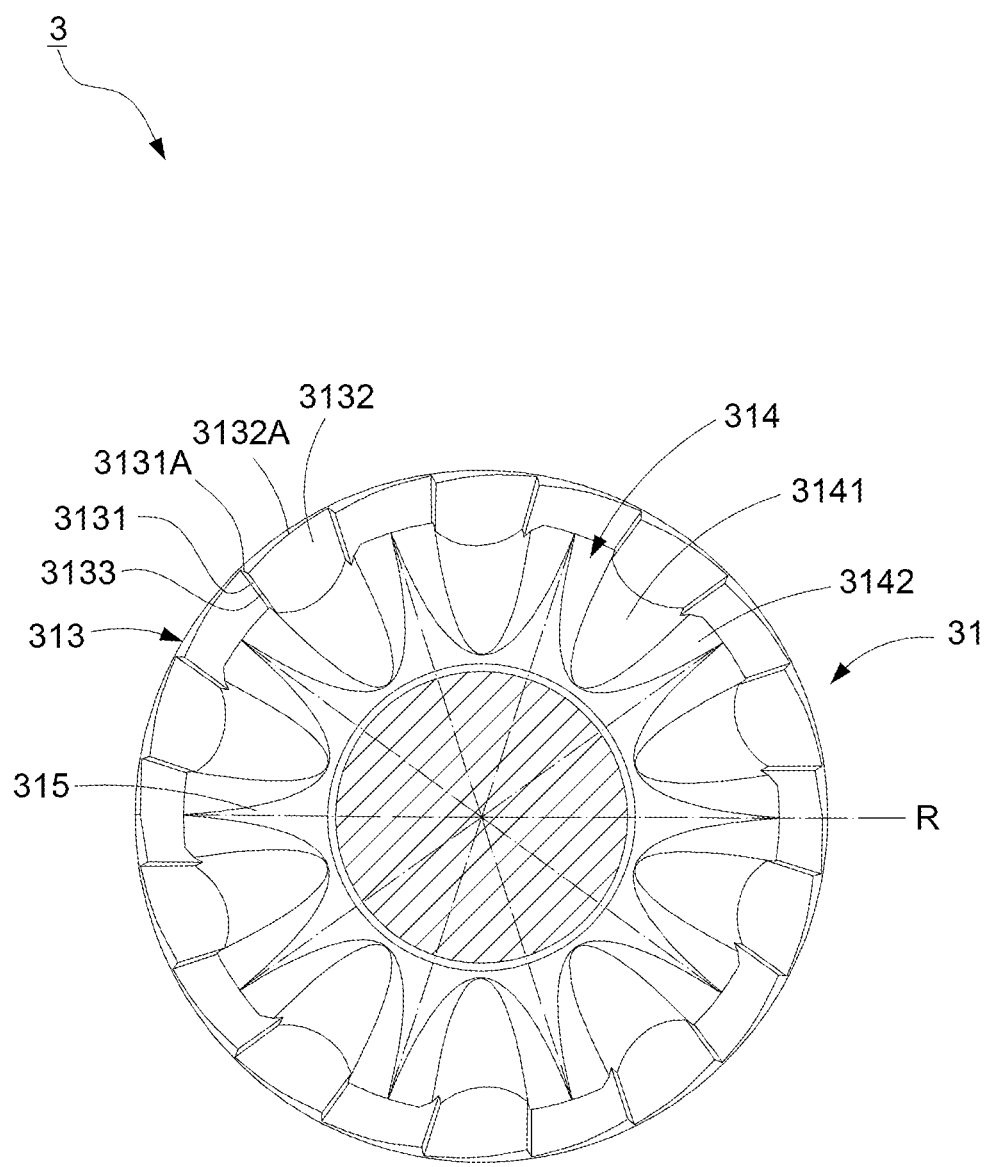
FIG. 4 is a cross-sectional view showing the reference lines as seen along the line A-A of FIG. 3.

Referring to FIG. 3, a first preferred embodiment of a screw 3 of this invention is disclosed. The screw 3 includes a head 31, a shank 32 having an end connected to the head 31, a drill section 33 disposed on another end of the shank 32 opposite to the head 31, and a plurality of thread convolutions 34 spirally disposed on the shank 32. The head 31 has a top surface 311, a conical surface 312 opposite to the top surface 311, a plurality of cutting units 313 connected together in sequence along an outer edge of the top surface 311, a plurality of accommodation portions 314 recessedly formed in the conical surface 312, and a plurality of ridge portions 315 protruding outwards from the conical surface 312. Each ridge portion 315 is formed between every two adjacent accommodation portions 314. In other words, each accommodation portion 314 is formed between every two adjacent ridge portions 315 so that the accommodation portions 314 and the ridge portions 315 are arranged in an alternating manner. Meanwhile, the accommodation portions 314 and the ridge portions 315 are located between the cutting units 313 and the shank 32. In this preferred embodiment, a plurality of references lines R are defined radially from a center of the conical surface 312 as shown in FIG. 4. Each ridge portion 315 extends respectively along the references lines R. Each accommodation portion 314 expands gradually from the direction of the shank 32 toward the cutting units 313. On the contrary, each ridge portion 315 tapers gradually from the direction of the shank 32 toward the cutting units 313.

Referring to FIG. 3, each cutting unit 313 has a first wall 3131, a second wall 3132 connected to the first wall 3131, and a third edge 3133 formed along a junction of the first wall 3131 and the second wall 3132. The first wall 3131 defines a first edge 3131A which is connected to a second edge 3132A defined by the second wall 3132. The second edge 3132A of each second wall 3132 extends from one first wall 3131 of one cutting unit 313 to another first wall 3131 of another cutting unit 313 adjacent to the one first wall 3131 so that the cutting units 313 are arranged in a continuous connecting manner. The cutting units 313 connects one after another to form a ladder shape. Therefore, a screwing direction of the screw 3 allows the first edges 3131A and the third edges 3133 to cut fibers effectively. Each accommodation portion 314 has a main groove 3141 and an auxiliary groove 3142 disposed around an outer periphery of the main groove 3141, and that makes the main groove 3141 and the auxiliary groove 3142 different. The main groove 3141 is recessedly formed in the conical surface 312 and extend toward the direction of the shank 32. Each ridge portion 315 is formed along a junction of every two adjacent auxiliary grooves 3142 of every two adjacent accommodation portions 314 and situated between every two adjacent main grooves 3141. In this preferred embodiment, the number of the cutting units 313 is two times larger than the number of the accommodation portions 314 so that the main grooves 3141 are connected to part of the cutting units 313 and the auxiliary grooves 3142 are connected to the remainder of the cutting units 313. The relation of the number between the cutting units 313 and the accommodation portions 314 can be varied according to needs. An area of each auxiliary groove 3142 is smaller than an area of each main groove 3141.

Figure 5:
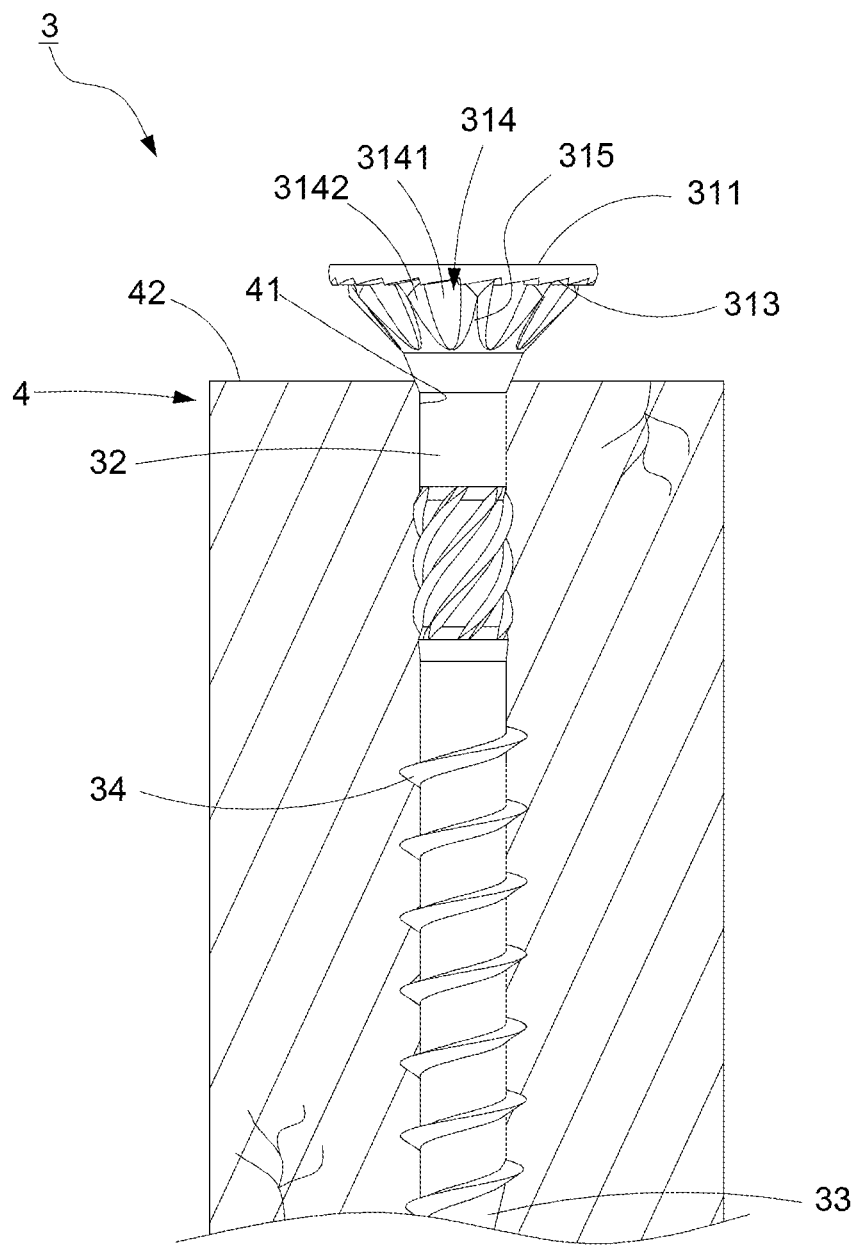
FIG. 5 is a schematic view showing a screwing operation of the first preferred embodiment.

Referring to FIGS. 3, 4 and 5, a screwing operation of the screw 3 begins with positioning the drill section 33 against a surface 42 of a workpiece 4. The drill section 33 and the thread convolutions 34 cut downwards into the workpiece 4 and form a drilling hole 41 in the workpiece 4. When the drill section 33 and the thread convolutions 34 cut downwards to further enter the shank 32 into the workpiece 4 through the drilling hole 41 gradually, fibers which are not completely severed and chips which are generated by the cutting of the drill section 33 and the thread convolutions 34 will move outwards gradually along the thread convolutions 34. The chips and the fibers then accumulate at a periphery of the drilling hole 41 and cause burrs which incur a ragged edge of the workpiece 4, and synchronously the first edges 3131A, the second edges 3132A, and the third edges 3133 of the cutting units 313 are adapted to cut the unsevered fibers into chips to thereby break the fibers effectively, smooth the burrs of the ragged edge of the drilling hole 41, and prevent the head 31 from being entangled in the fibers. Thus, the screwing resistance is reduced and the screwing operation is accelerated effectively. Meanwhile, the ridge portions 315 can also assist in cutting the fibers, and simultaneously guiding the chips into the accommodation portions 314. Because each accommodation portion 314 is provided with the main groove 3141 surrounding by the auxiliary groove 3142 whereby the auxiliary groove 3142 is adapted to connect between the main groove 3141 and the corresponding ridge portions 315. Therefore, the chips pushed by the ridge portions 315 can enter into the main groove 3141 through the auxiliary groove 3142 smoothly and quickly. Further, the accommodation portions 314 enlarge spaces for holding the chips to thereby attain a tight engagement between the screw 3 and the workpiece 4, prevent the chips from being unduly accumulated around the head 31, improve the surface flatness of the screw 3 after the screw 3 is embedded in the workpiece 4, and prevent the workpiece 4 from cracking caused by pressing the unduly accumulated chips.

Figure 6:
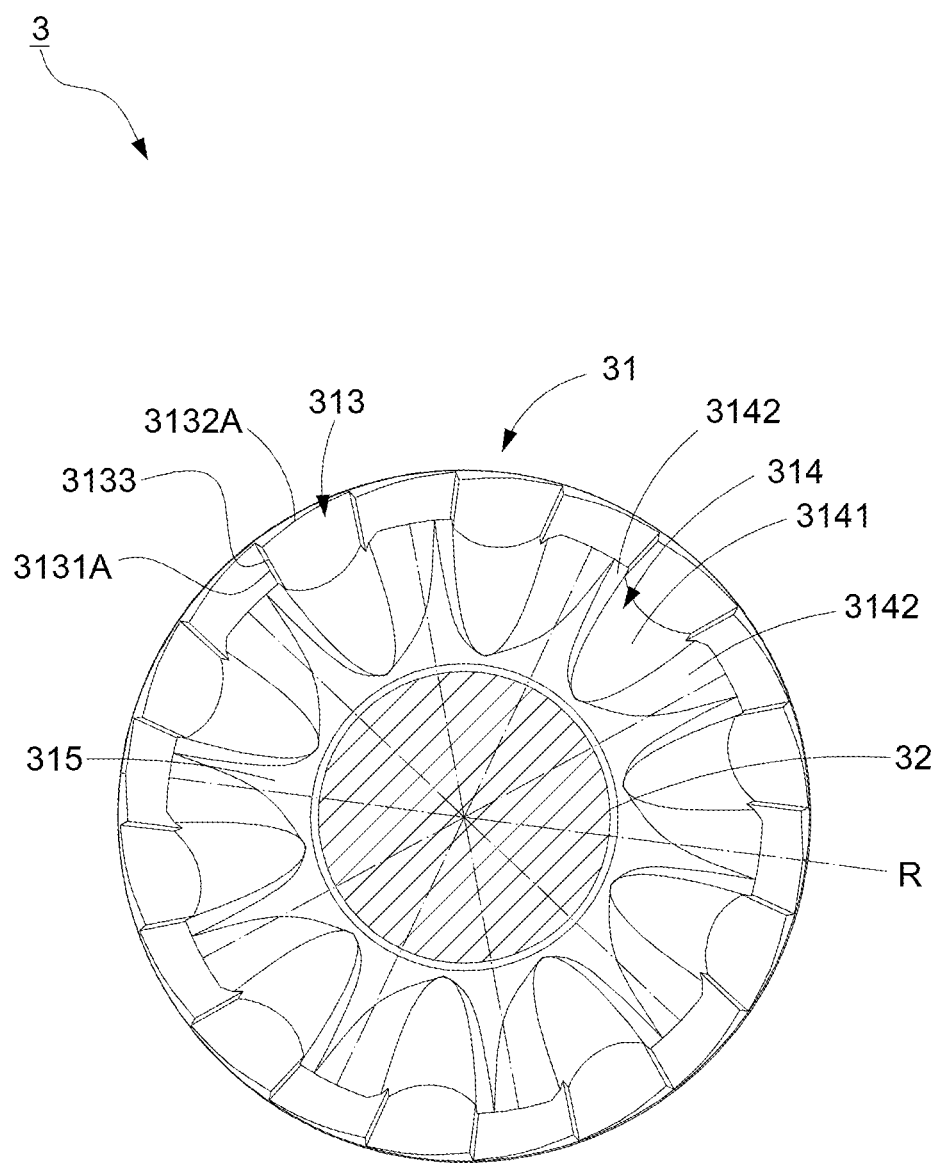
FIG. 6 is a schematic view showing a second preferred embodiment of this invention characterized by a plurality of ridge portions each is inclined to the corresponding reference line.

Referring to FIG. 6 shows a second preferred embodiment of the screw 3 of this invention. The correlated elements and the concatenation of elements, the operation and objectives of the second preferred embodiment are the same as those of the first preferred embodiment. This embodiment is characterized in that each ridge portion 315 extends between each cutting unit 313 and the shank 32 in a direction which is inclined to each corresponding one of the reference lines R. An inclined direction of the ridge portions 315 can be varied according to needs. Thus, the screwing direction of the screw 3 facilitates the cutting operation of the ridge portions 315 to thereby cut the fibers into chips entirely. The ridge portions 315 further push the chips into the accommodation portions 314 to thereby avoid unduly accumulated chips, decrease the screwing resistance, and allow the screw 3 to be embedded into the workpiece 4 (not shown) levelly and entirely.

To sum up, the screw of this invention takes advantages of the cutting units connected continuously along the outer edge of the top surface to sever the fibers and smooth the burrs causing the ragged edge of the workpiece to thereby prevent the head from entwining with the fibers and reduce the screwing resistance. Meanwhile, the ridge portions assist in cutting the fibers and leading the chips into the accommodation portions. The accommodation portions also help extend spaces for accommodating the chips. Hence, the screw and the workpiece are engaged tightly. The chips will not accumulate around the head unduly. The screwing resistance is reduced. The screw is embedded in the workpiece levelly.

While the embodiments of this invention are shown and described, it is understood that further variations and modifications may be made without departing from the scope of this invention.

What is claimed is:
1. A screw comprising:
a head including a top surface and a conical surface opposite to said top surface;
a shank extending axially from said head and including a drill section opposite to said head; and
a plurality of thread convolutions spirally disposed on said shank;

wherein said head includes a plurality of cutting units extending circumferentially of said top surface at an outer edge thereof, a plurality of accommodation portions recessedly provided in said conical surface, and a plurality of ridge portions each situated between every two adjacent accommodation portions, said plurality of accommodation portions and said plurality of ridge portions being situated between said plurality of cutting units and said shank and being arranged in an alternating manner; and wherein each of said plurality of cutting units includes a first wall defining a first edge, a second wall defining a second edge connected to said first edge, and a third edge defined along a junction of said first wall and said second wall, with said second edge extending from one first wall of one cutting unit to another first wall of another cutting unit adjacent to said one first wall, and said plurality of cutting units thereby being connected one after another, each of said plurality of accommodation portions including a main groove recessedly formed in said conical surface and extending in the direction of said shank and an auxiliary groove formed around an outer periphery of said main groove so that said auxiliary groove is different from said main groove, and each of said plurality of ridge portions thereby being defined along a junction of each adjacent pair of auxiliary grooves of every two adjacent accommodation portions and situated between every two adjacent main grooves.

2. The screw according to claim 1, wherein an area of said auxiliary groove is smaller than an area of said main groove.

3. The screw according to claim 1, wherein the number of said cutting units is at least two times larger than the number of said accommodation portions.

4. The screw according to claim 3, wherein said main grooves are connected to part of said cutting units, and said auxiliary grooves are connected to the remainder of said cutting units.

5. The screw according to claim 1, wherein said plurality of ridge portions extend respectively along a plurality of references lines defined radially from a center of said conical surface.

6. The screw according to claim 1, wherein a plurality of references lines are defined radially from a center of said conical surface, each of said plurality of ridge portions extending between each said cutting unit and said shank in a direction, with said direction inclined to each corresponding one of said reference lines.

* * * * *